Patented Nov. 4, 1952

2,616,899

UNITED STATES PATENT OFFICE 2,616,899

CHLORINATED EPOXY COMPOUNDS

Elbert C. Ladd, Passaic, N. J., assignor to United States Rubber Company, New York, N. Y., a corporation of New Jersey No Drawing. Application March 26, 1951, Serial No. 217,673

2 Claims. (Cl. 260—348)

This invention relates to a new composition of matter. More particularly, it is concerned with the one-to-one molecular addition product of 3,4-epoxy-1-butene and hexachlorocyclopentadiene.

The reaction appears to take the following course:

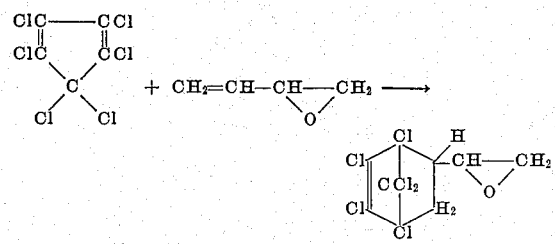

In any event, an adduct is formed containing the components of each of the separate starting chemicals.

There may be used a mole-for-mole reaction mixture, or an excess of either component may be used if desired. The reaction proceeds at a suitable rate in the temperature range 80° C.–200° C., although somewhat lower and somewhat higher temperatures can be used, if desired. The higher temperatures require a closed system, particularly at the beginning of the reaction, in order to prevent escape of the more volatile reactant. Heating at suitable temperature is continued until the reaction is complete. This may require as long as 1 hour. Reaction times in excess of 20 hours are unnecessary.

The chemical of the invention is useful as an intermediate for further syntheses and is useful in the formulation of flame-proofing agents and as a stabilizer for plastics such as polyvinyl chloride, polyvinylidene chloride, etc.

The following example illustrates my invention in more detail.

Example

A mixture of 54.6 grams of hexachlorocyclopentadiene and 20 grams of 3,4-epoxy-1-butene is heated to reflux in a flask under a water cooled reflux condenser. The reflux temperature at the beginning of the reaction is about 83° C. After heating for about 20 hours it is noted that the reflux temperature has increased to about 130–140° C., indicating that reaction has occurred. The reaction mixture is cooled whereupon it partially solidifies. The solid is separated by filtration and recrystallized from methanol to yield a white solid, M. 87–89° C.

Analysis: Found: Cl, 61.71%. Theory for 1,4,-5,6,7,7 - hexachloro - 2 - epoxyethylbicyclo[2.2.1]-5-heptene: Cl, 62.07%.

Having thus described my invention, what I claim and desire to protect by Letters Patent is:

1. A method which comprises heating 3,4-epoxy-1-butene with hexachlorocyclopentadiene for a period of time in the range from about 1 to about 20 hours, to effect reaction between said chemicals, subsequently cooling the reaction mixture and recovering a crystalline solid melting in the range of from about 87° C. to about 89° C.

2. The product of the process of claim 1.

ELBERT C. LADD.

REFERENCES CITED

The following references are of record in the file of this patent:

FOREIGN PATENTS

| Number | Country | Date |
|---|---|---|
| 614,931 | Great Britain | of 1948 |